Figure 1:
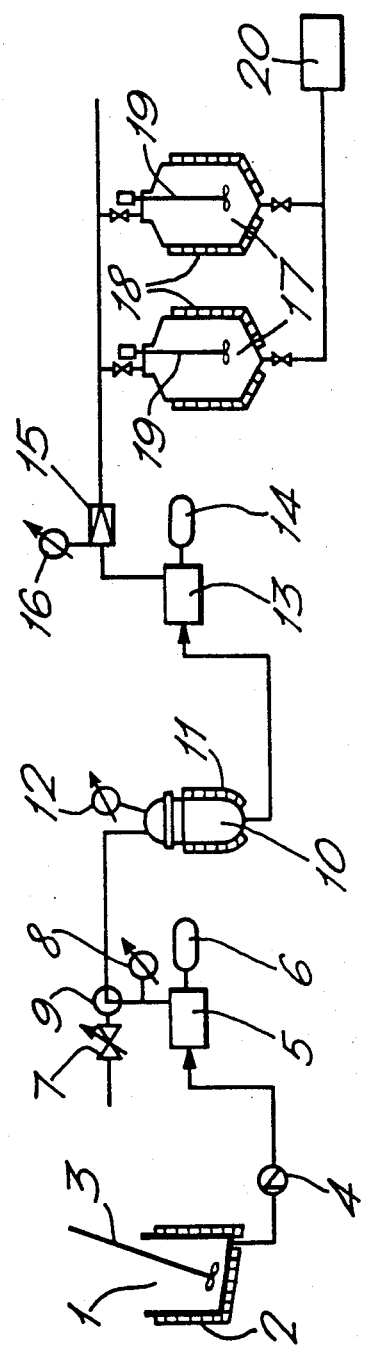

United States Patent [19]

Padly et al.

[11] Patent Number: 4,511,589

[45] Date of Patent: Apr. 16, 1985

[54] PASTEURIZATION OF EGGS

[75] Inventors: Yvan Padly, La Tour-de-Peilz; Roger Borgeaud, Vevey, both of Switzerland

[73] Assignee: Societe d'Assistance Technique pour Produits Nestle S.A., Lausanne, Switzerland

[21] Appl. No.: 483,129

[22] Filed: Apr. 8, 1983

[51] Int. Cl.³ .......................... A23L 3/00; F28F 17/00
[52] U.S. Cl. ...................................... 426/521; 165/94; 422/1
[58] Field of Search ...................... 426/521, 330.1, 614, 426/298, 325; 165/94; 422/1

[56] References Cited

U.S. PATENT DOCUMENTS 2,093,786  9/1937  Swarthout ........................ 426/325
2,901,225  8/1959  Abrams ............................ 165/94
2,936,240  5/1960  Kauffman et al. ............... 426/521

Primary Examiner—George Yeung
Attorney, Agent, or Firm—Vogt & O'Donnell

[57] ABSTRACT

A process for the continuous pasteurization of eggs characterized in that liquid egg material is passed under a superatmospheric operating pressure through a first scraped surface heat exchanger to raise the temperature of the egg material to the pasteurization temperature after which it is passed to a heated holding vessel under pressure of a sterile inert gas for a period of time which ensures pasteurization but which is sufficiently short to ensure that substantially no coagulation occurs, and finally through a second scraped surface heat exchanger where it is cooled to a temperature below 10° C. over a period of time less than 5 minutes.

8 Claims, 1 Drawing Figure

PASTEURIZATION OF EGGS

The present invention relates to a process for the pasteurisation of eggs, more particularly for the continuous pasteurisation thereof.

Conventionally, eggs are pasteurised batchwise by stirring the liquid egg material in a vessel surrounded by a hot water jacket so that the eggs are heated over a period of about 5 hours to a temperature of about 60° C. However such conditions constitute a dangerous temperature environment for the growth of harmful bacteria. Afterwards the eggs are cooled down over a similar time period in the same dangerous temperature environment and a reliable product stability is not always obtained.

A continuous process for pasteurising eggs is known using plate heat exchangers but the high viscosity of the egg yolk causes serious problems with the flowability.

We have now found that by using scraped surface heat exchangers we can pasteurise eggs by a continuous process without any problems with the flowability and obtain an improved product stability when compared with the conventional batch process.

Accordingly, the present invention provides a process for the continuous pasteurisation of eggs wherein liquid egg material is passed under a superatmospheric operating pressure through a first scraped heat exchanger to raise the temperature of the egg material to the pasteurisation temperature after which it is passed to a heated holding vessel under pressure of a sterile inert gas for a period of time which ensures pasteurisation but which is sufficiently short to ensure that substantially no coagulation occurs, and finally passed through a second scraped surface heat exchanger where it is cooled to a temperature below 10° C. over a period of time of less than 5 minutes.

The process of this invention may be applied to whole eggs, egg white or egg yolk; the egg yolk may be either natural, sweetened or salted.

Before being passed to the first scraped surface heat exchanger the liquid egg material is conveniently stored with stirring in a storage vat which may be cooled with ice-water. The liquid egg material is suitably pumped from the storage vat to the first scraped surface heat exchanger which is conveniently heated by steam generally at a maximum temperature of 105° C. and maintained under the chosen operating pressure. The operating pressure is generally not more than 3 bars absolute because above 3 bars the costs of the equipment and the pumping energy are not commercially feasible. Conveniently the operating pressure is from 1.00 to 2.75 bars absolute and preferably from 1.5 to 2.5 bars absolute.

The time taken for the egg material to reach the pasteurisation temperature is desirably as short as possible and is generally not longer than 2 minutes, conveniently from 10 to 90 seconds, preferably from 20 to 75 seconds and especially from 30 to 60 seconds.

Advantageously, the egg material is passed to the heated holding vessel substantially as soon as it reaches the pasteurisation temperature. The holding vessel conveniently has been preheated to the pasteurisation temperature of the egg material, for instance, by means of a hot water jacket and advantageously has been prepressurised to a pressure less than the operating pressure by means of a sterile inert gas, for example, sterile nitrogen gas.

The achievement of pasteurisation depends on the temperature and the retention time which parameters are inversely proportional. Therefore, the pasteurisation temperature chosen depends on the retention time in the holding vessel. For example, pasteurisation may be achieved at temperatures as low as about 45° C. but this would require retention times of about 100 hours or more which are not commercially attractive. Suitable pasteurisation temperatures at various minimum retention times for different egg materials are given in the following table:

| TIME (MINS) | EGG WHITE | WHOLE EGG | EGG YOLK | SUGARED WHOLE EGG | SUGARED EGG YOLK | SALTED WHOLE EGG | SALTED EGG YOLK |
| --- | --- | --- | --- | --- | --- | --- | --- |
| 100 | 51° C. | 53° C. | 54° C. | 55° C. | 56° C. | 58° C. | 61° C. |
| 10 | 55° C. | 59° C. | 58° C. | 60° C. | 61° C. | 64° C. | 68° C |
| 5 | 55.5° C. | 60° C. | 59° C. | 61.5° C. | 61° C. | 65° C. | 70° C. |
| 2 | 57° C. | 62° C. | 61° C. | 64° C. | 65° C. | 68° C. | 74° C. |
| 1 | 59° C. | 63° C. | 64° C. | 65° C. | 66° C. | 70° C. | 76° C. |

Although higher temperatures may be used to achieve pasteurisation the temperature should be sufficiently low and the retention time sufficiently short to prevent substantial coagulation of the egg material. By means of prepressurising the holding vessel with a sterile inert gas, it is possible to obtain the appropriate retention time (t) for different egg materials using the same holding vessel at the chosen operating pressure used. The prepressure (Po) is a function of the retention volume (Vprod), the total volume of the holding vessel (Vo), and the operating pressure (Pop) to be maintained in the vessel during pasteurisation and is calculated as follows:

$$Po = Pop \cdot \left(1 - \frac{Vprod}{Vo}\right)$$

The retention time of the egg material in the vessel is given by the following equation:

$$t = \frac{Vprod}{\overset{\circ}{V}}$$

where $\overset{\circ}{V}$ is the constant feed rate of the egg material.

After pasteurisation the egg material passes to a second scraped surface heat exchanger which may conveniently be cooled by a cryogenic liquid, for instance, liquid $NH_3$, liquid $CO_2$, liquid $SO_2$ or advantageously directly evaporated Freon. The cooling time is desirably as short as possible and is generally not longer than 2 minutes, preferably from 0.5 to 1.5 minutes and especially from 0.6 to 1.25 minutes. The egg material is preferably cooled to a temperature below 7° C. The temperature of the cooling material is preferably at least 5° C. below the temperature to which it is desired to cool the egg material.

The pasteurised and chilled egg material may then be stored, conveniently in sterile containers which are cooled, for example, by ice-water. The egg material may afterwards be filled aseptically.

Before the process is carried out, it is necessary, as is usual in such processes, to clean and sterilise the installation, for example, by steam sterilising or chemical sterilising following by cleaning-in-place. After steam sterilising, the hot inner surfaces of the equipment must be cooled down to about 60° C. using, conveniently, cold sterile water.

The present invention will now be further illustrated by way of example with reference to the following drawing in which FIG. 1 is a schematic view of an installation for use in the process.

The installation comprises a storage bin 1 cooled with ice-water 2 and fitted with a stirrer 3. A metering pump 4 is situated between the storage bin 1 and a first scraped surface heat exchanger 5 having a motor 6, heated by steam and attached to a precision valve 7, a pressure-gauge 8 and a three-way cock 9. A holding vessel 10 having a volume of 12.2 liters with a hot-water jacket 11 is fitted with a pressure gauge 12. A second scraped surface heat exchanger 13 having a motor 14, is cooled by directly evaporated Freon and is attached to a back pressure valve 15 and a pressure gauge 16. Finally there are two sterile containers 17 cooled by ice-water 18 and fitted with stirrers 19 followed by an aseptic filling device 20.

Before pasteurising egg yolk, the whole installation is thoroughly cleaned and then the heat exchangers 5 and 13, the holding vessel 10, the back-pressure valve 15, the containers 17 and the filling device 20 are sterilised with steam at 110° C. to 120° C. for 30 minutes after which the inner surfaces of the equipment are cooled to 60° C. using sterile water.

After this sterilisation step, the holding vessel 10 is prepared which comprises heating it to 65° C. by means of hot water circulating in the jacket 11 and prepressurising it by means of sterile nitrogen gas to 1.5 bars absolute.

The egg yolk is then pumped by means of the metering pump 4 from the storage bin 1 at a feed rate $\overset{\circ}{V}$ of 1 liter/min. through the heat exchanger 5 which is heated by steam at 105° C.

The yolk by-passes the holding vessel 10 by means of the three-way cock 9 until the pasteurising temperature of 66° C. is reached. During this time, the chosen operating pressure Pop of 2 bars is maintained in the heat exchanger 5 by means of the precision valve 7 which pressure is indicated on the pressure gauge 8. The back-pressure valve 15 is set for opening at the operating pressure of 2 bars which pressure is indicated by pressure gauge 16. The heating time in the heat exchanger is 0.5 minutes.

As soon as the yolk temperature is constant at 66° C., the three-way cock is switched over and the yolk begins filling the holding vessel 10. Since the back-pressure valve 15 is still closed, the yolk compresses the gas into the vessel and its pressure increases. The instant that the pressure reaches the operating pressure of 2 bars, the valve 15 opens and allows the passage of the pasteurised yolk through the second scraped surface heat exchanger 13. From this moment, the retained yolk volume in the holding vessel 10 remains constant, equal to the retention volume Vprod and a retention time t of 6 minutes is assured.

The yolk is cooled down to 6° C. in the heat exchanger 13 in 0.9 minutes and then stored in the ice-water cooled containers 17 until its aseptic filling in the filling device 20.

The pasteurised egg yolk had excellent bacteriological, organoleptical and functional properties.

We claim:

1. A process for the continuous pasteurisation of eggs comprising:
   (a) passing liquid egg material under a superatmospheric operating pressure through a first scraped surface heat exchanger to raise the temperature of the egg material to the pasteurisation temperature;
   (b) passing the heated egg material to a heated holding vessel under pressure of a sterile inert gas for a period of time which ensures pasteurisation but which is sufficiently short to ensure that substantially no coagulation occurs; and then
   (c) passing the pasteurised egg material through a second scraped surface heat exchanger where it is cooled to a temperature below 10° C. over a period of time of less than 5 minutes.

2. A process according to claim 1, wherein the operating pressure is from 1.5 to 2.5 bars absolute.

3. A process according to claim 1, wherein the time taken for the liquid egg material to reach the pasteurisation temperature in the first scraped surface heat exchanger is from 30 to 60 seconds.

4. A process according to claim 1, wherein the holding vessel is previously heated to the pasteurisation temperature of the egg material.

5. A process according to claim 1, wherein the holding vessel is pressurised by a sterile inert gas to a pressure less than the operating pressure.

6. A process according to claim 1, wherein the second scraped surface heat exchanger is cooled by directly evaporated Freon.

7. A process according to claim 1, wherein the cooling time of the egg material in the second scraped surface heat exchanger is from 0.6 to 1.25 minutes.

8. A process for the continuous pasteurisation of eggs comprising:
   (a) passing liquid egg material under a superatmospheric operating pressure through a first scraped surface heat exchanger to raise the temperature of the egg material to the pasteurisation temperature;
   (b) passing the heated egg material to a heated holding vessel under pressure of a sterile inert gas which pressure is less than the operating pressure, the pressure in said vessel increasing as heated egg material accumulates therein;
   (c) passing the pasteurised egg material from the holding vessel to a second scraped surface heat exchanger when the pressure in the holding vessel is equal to the operating pressure, said egg material thereby having been in the holding vessel for a period of time which ensures pasteurisation but which is sufficiently short to ensure that substantially no coagulation occurs; and
   (d) cooling the pasteurised egg material in the second scraped surface heat exchanger to a temperature below 10° C. over a period of time of less than 5 minutes.

* * * * *